United States Patent
Lee et al.

(10) Patent No.: US 8,633,615 B2
(45) Date of Patent: Jan. 21, 2014

(54) WIRELESS POWER TRANSMISSION/RECEPTION APPARATUS AND METHOD

(75) Inventors: Kwang Du Lee, Jeollanam-do (KR); Kyung Uk Kim, Seoul (KR); Jeong Hoon Kim, Seoul (KR); Eung Ju Kim, Gyunngi-do (KR)

(73) Assignee: Samsung Electro-Mchanics Co., Ltd., Suwon (KR)

( * ) Notice: Subject to any disclaimer, the term of this patent is extended or adjusted under 35 U.S.C. 154(b) by 724 days.

(21) Appl. No.: 12/630,348

(22) Filed: Dec. 3, 2009

(65) Prior Publication Data
US 2011/0080051 A1 Apr. 7, 2011

(30) Foreign Application Priority Data
Oct. 7, 2009 (KR) .......................... 10-2009-0095284

(51) Int. Cl.
*H01F 38/00* (2006.01)
(52) U.S. Cl.
USPC ........... 307/104; 307/140; 307/149; 307/151; 363/21.02; 235/451
(58) Field of Classification Search
USPC ............... 307/104, 140, 149, 151; 363/21.02; 235/451
See application file for complete search history.

(56) References Cited

U.S. PATENT DOCUMENTS

| 2004/0130915 | A1* | 7/2004 | Baarman | 363/21.02 |
| 2004/0134985 | A1* | 7/2004 | Deguchi et al. | 235/451 |
| 2008/0143536 | A1* | 6/2008 | Camp et al. | 340/572.7 |

FOREIGN PATENT DOCUMENTS

KR 1020090056546 6/2009

OTHER PUBLICATIONS

Office Action from counterpart Korean Patent Application No. 10-2009-0095284, Mar. 3, 2011, 6 pages.

* cited by examiner

*Primary Examiner* — Jared Fureman
*Assistant Examiner* — Alfonso Perez Borroto
(74) *Attorney, Agent, or Firm* — McDermott Will & Emery LLP (57) ABSTRACT

Disclosed herein is a wireless power transmission/reception apparatus. The wireless power transmission/reception apparatus includes a wireless power transmission unit and a wireless power reception unit. The wireless power transmission unit receives power, generates a wireless power signal to be wirelessly transmitted, wirelessly transmits the generated wireless power signal in a magnetic resonance manner, receives a returned wireless power signal and detects the number of power consumption devices, and wirelessly transmits a wireless power signal using resonance frequency appropriate for the number of power consumption devices.

17 Claims, 8 Drawing Sheets

WIRELESS POWER TRANSMISSION/RECEPTION APPARATUS AND METHOD

CROSS REFERENCE TO RELATED APPLICATION

This application claims the benefit of Korean Patent Application No. 10-2009-0095284, filed on Oct. 7, 2009, entitled "Wireless Power Transmission Apparatus and Method thereof," which is hereby incorporated by reference in its entirety into this application.

BACKGROUND OF THE INVENTION

1. Technical Field

The present invention relates generally to a wireless power transmission/reception apparatus and method, and, more particularly, to a wireless power transmission/reception apparatus and method which enable the active detection of the reception environment of the wireless power transmission/reception apparatus without using a separate wireless communication device.

2. Description of the Related Art

With the development of wireless communication technology, ubiquitous information environments enabling anyone to exchange desired information anytime and anywhere have been implemented. However, most communication information devices still depend on batteries and are supplied with power through power cords, and thus the use of communication information devices is limited. Therefore, the environment of a wireless information network cannot be actually freed from this limitation until the problem of terminal power is solved.

In order to solve this problem, various types of technologies for transmitting power in a wireless manner have been developed.

First, representative technologies may include radio reception technology using microwaves, magnetic induction technology using a magnetic field, and magnetic resonance technology using energy conversion between a magnetic field and an electric field.

Radio reception technology is advantageous because microwaves are radiated into the air through an antenna, and thus long-distance power transmission is made possible. However, radio reception technology has high radiation loss due to the consumption of power by the air, and thus the efficiency of power transmission is limited.

Furthermore, magnetic induction technology is a technology based on magnetic energy coupling using the primary coil of a transmitting end and the secondary coil of a receiving end, and is advantageous in that the efficiency of power transmission is high. However, magnetic induction technology is disadvantageous in that the primary coil of the transmitting end and the secondary coil of the receiving end must be located adjacent to each other within a short distance of about several mm so as to transmit power, in that the efficiency of power transmission rapidly changes according to the alignment of the primary coil of the transmitting end and the secondary coil of the receiving end, and in that the amount of heat generated is large.

Therefore, magnetic resonance technology that is similar to magnetic induction technology has recently been developed, but it is configured to concentrate energy on a specific resonant frequency determined by an inductor L and a capacitor C, and thus to transmit power in the form of magnetic energy. This is advantageous because a relatively large amount of power can be transmitted even a distance of several meters, but requires high resonance characteristics (a high quality factor).

That is, magnetic induction technology is disadvantageous because the efficiency of power transmission rapidly changes depending on whether impedance matching has been achieved or whether the resonant frequencies of the LC circuits of the transmitting and receiving ends are identical to each other.

Conventional magnetic induction technology deals with the above problems via communication between the transmitting end and the receiving end by installing transceivers both on the transmitting and receiving ends. However, when the transceivers are installed separately, problems arise in that the cost of wireless power transmission and reception units increases and the construction of the apparatus is complicated.

SUMMARY OF THE INVENTION

Accordingly, the present invention has been made keeping in mind the above problems occurring in the prior art, and the present invention is intended to provide a wireless power transmission/reception apparatus which is not provided with separate transceiver modules for performing communication between transmitting and receiving ends and can perform wireless power transmission using only a wireless power transmission unit and a wireless power reception unit, and a wireless power transmission/reception method.

In order to accomplish the above object, the present invention provides a wireless power transmission/reception apparatus, including a wireless power transmission unit for receiving power from an outside, generating a wireless power signal to be wirelessly transmitted, wirelessly transmitting the generated wireless power signal in a magnetic resonance manner, receiving a returned wireless power signal and detecting a number of power consumption devices, and wirelessly transmitting a wireless power signal using resonance frequency appropriate for the number of power consumption devices, thereby transmitting the wireless power signals so that power can be supplied to the power consumption devices; and a wireless power reception unit installed in each of the power consumption devices, and configured to receive the wireless power signal from the wireless power transmission unit in a magnetic resonance manner, provide the wireless power signal to at least one connected power consumption device, and return a remaining wireless power signal, not consumed by at least one unconnected power consumption device, to the wireless power transmission unit.

The wireless power transmission unit includes a power signal generator for receiving the power from the outside, and generating and outputting the wireless power signal, that is, power to be wirelessly transmitted; a first resonance antenna comprised of an inductor and a capacitor, and configured to transmit the wireless power signal in a magnetic resonance manner using resonance frequency depending on the inductor and the capacitor, and receive and output the returned wireless power signal output from the wireless power reception unit; a directional power coupler having directionality so that the wireless power signal input from the power signal generator through a first port thereof is output to the first resonance antenna through a second port thereof and the returned wireless power signal input from the first resonance antenna through the second port is output through a third port thereof; a power detector for detecting and outputting power of the returned wireless power signal output through the third port of the directional power coupler; and a controller for detecting the number of power consumption devices based on intensity of the power of the returned wireless power signal detected by the power detector, and controlling the first resonance antenna so that the wireless power signal is transmitted using resonance frequency and power intensity appropriate for the detected number of power consumption devices.

The wireless power reception unit includes a second resonance antenna comprised of an inductor and a capacitor, and configured to receive the wireless power signal from the wireless power transmission unit using resonance frequency depending on the inductor and the capacitor in a magnetic resonance manner and return the remaining wireless power signal to the wireless power transmission unit; a power signal converter connected to each of a plurality of power consumption devices, configured to convert the wireless power signal received through the second resonance antenna into a power signal appropriate for a power supply method and supply the resulting power signal to the power consumption device; a power detector for detecting and outputting power intensity of the wireless power signal received through the second resonance antenna; and a controller for performing control so that the wireless power signal is received using the second resonance antenna and power is supplied to the power consumption device and so that the remaining wireless power signal is returned to the wireless power transmission unit.

According to another aspect of the present invention, there is provided a wireless power transmission/reception method including a wireless power transmission unit transmitting a wireless power signal to a wireless power reception unit in a magnetic resonance manner, being returned a remaining wireless power signal of the wireless power signal to be provided to a power consumption device in which the wireless power reception unit has been installed, and determining whether at least one power consumption device has been connected; and the wireless power transmission unit, if at least one power consumption device is determined to have been connected, searching for a resonance frequency at which maximum power transmission is performed, detecting a number of power consumption devices using the found resonance frequency, and transmitting a wireless power signal at a power intensity appropriate for the detected number of power consumption devices.

According to another aspect of the present invention, there is provided a wireless power transmission method, including a wireless power transmission unit transmitting a wireless power signal to a wireless power reception unit in a magnetic resonance manner; the wireless power transmission unit receiving a returned wireless power signal from a wireless power reception unit, detecting a power intensity, and determining whether at least one power consumption device has been connected; and the wireless power transmission unit, if at least one power consumption device is determined to have been connected, searching for a resonance frequency at which maximum power transmission is performed, detecting a number of power consumption devices using the found resonance frequency, and transmitting a wireless power signal at a power intensity appropriate for the detected number of power consumption devices.

According to another aspect of the present invention, there is provided a wireless power reception method, including, when a wireless power reception unit receives a wireless power signal from a wireless power transmission unit, a power consumption device in which the wireless power reception unit has been installed receiving the transmitted wireless power signal and returning a remaining wireless power signal; and, when connection of power consumption device in which the wireless power reception unit has been installed is released, stopping receiving a wireless power signal from the wireless power transmission unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED
EMBODIMENTS

Reference now should be made to the drawings, in which the same reference numerals are used throughout the different drawings to designate the same or similar components.

Preferred embodiments of the present invention will be described in detail below with reference to the accompanying drawings.

Figure 1:
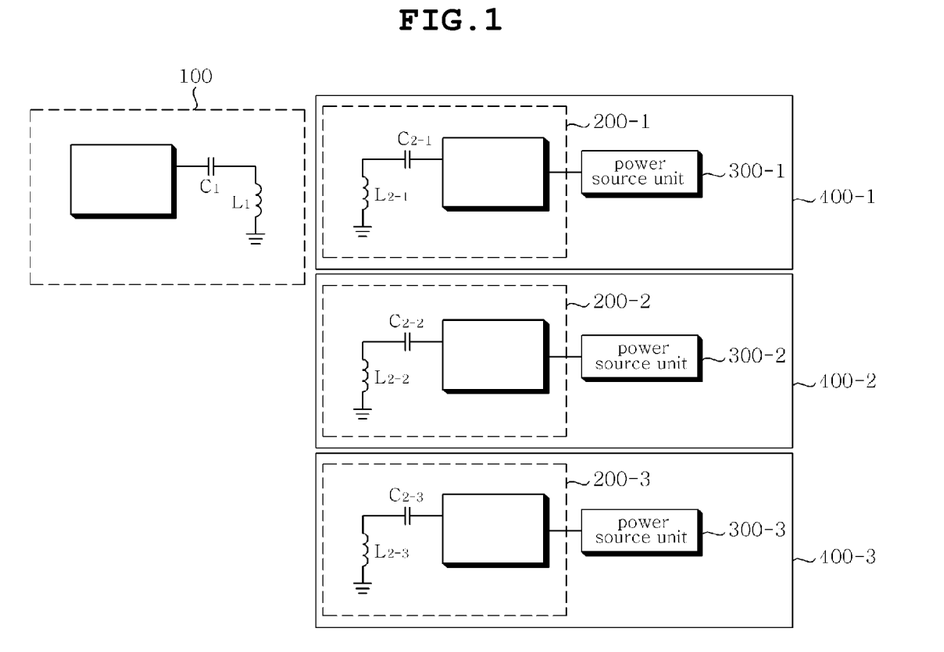
FIG. 1 is a schematic block diagram illustrating the construction of a wireless power transmission/reception apparatus according to a preferred embodiment of the present invention.

FIG. 1 is a schematic block diagram illustrating the construction of a wireless power transmission/reception apparatus according to a preferred embodiment of the present invention.

Referring to FIG. 1, the wireless power transmission/reception apparatus includes a wireless power transmission unit 100, and a plurality of wireless power reception units 200-1, 200-2 and 200-3 respectively installed in a plurality of power consumption devices 400-1, 400-2 and 400-3.

Wireless power received by the wireless power reception units 200-1, 200-2 and 200-3 installed in the power consumption devices 400-1, 400-2 and 400-3 is stored in power source units 300-1, 300-2 and 300-3.

Here, the power source units 300-1, 300-2 and 300-3 may use different power supply methods depending on the power consumption devices 400-1, 400-2 and 400-3.

The wireless power transmission unit 100 includes a capacitor C1 and an inductor L1, and each of the wireless power reception units 200 (200-1, 200-2 and 200-3) includes a capacitor C2-1, C2-2 or C2-3 and an inductor L2-1, L2-2 or L2-3. Accordingly, the wireless power transmission unit 100 and the wireless power reception units 200-1, 200-2 and 200-3 transmit and receive power using magnetic resonance.

Here, the wireless power transmission unit 100 sets an initial resonance frequency, and transmits a wireless signal (hereinafter referred to as 'a wireless power signal') to the wireless power reception units 200-1, 200-2 and 200-3 using the initial resonance frequency. Furthermore, the wireless power transmission unit 100 receives a wireless signal (hereinafter referred to as 'a returned wireless power signal') returned from the wireless power reception units 200-1, 200-2 and 200-3, and then detects the number of power consumption devices 400-1, 400-2 and 400-3 in which wireless power reception units 200-1, 200-2 and 200-3 in the state of receiving wireless power signals have been respectively installed.

The wireless power transmission unit 100 transmits a wireless power signal at a resonance frequency appropriate for the detected number of power consumption devices 400 in which wireless power reception units 200 in a signal receiving state have been respectively installed.

For ease of description, only wireless power transmission between a single wireless power transmission unit 100 and a single wireless power reception unit 200 will be described below.

Figure 2:
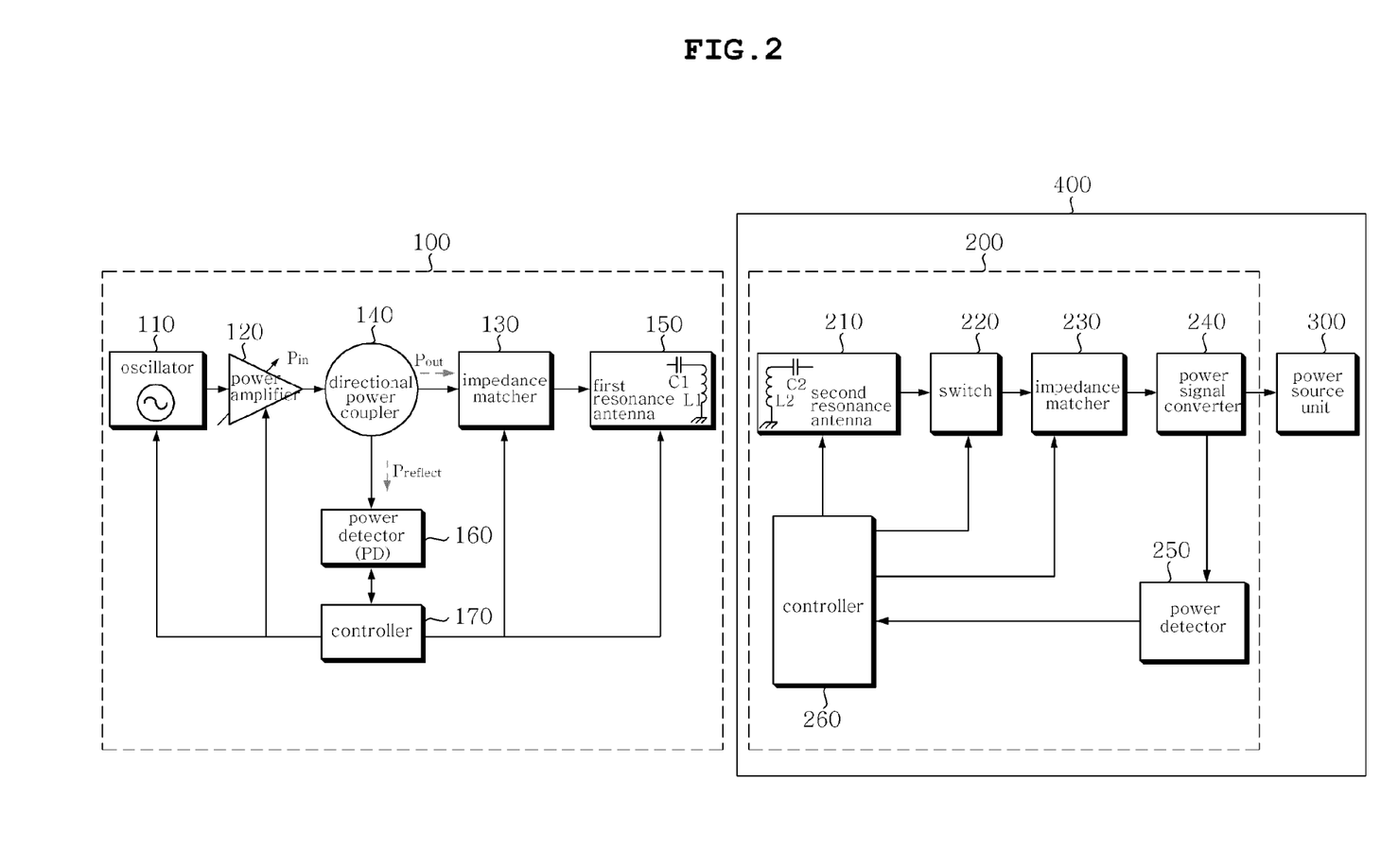
FIG. 2 is a detailed block diagram illustrating the construction of the wireless power transmission/reception apparatus according to the preferred embodiment of the present invention.

FIG. 2 is a detailed block diagram illustrating the construction of the wireless power transmission/reception apparatus according to the preferred embodiment of the present invention. Referring to FIG. 2, the wireless power transmission/reception apparatus includes a wireless power transmission unit 100, and a wireless power reception unit 200 installed in a power consumption device 400.

Energy transmission between the wireless power transmission unit 100 and the wireless power reception unit 200 using magnetic resonance will now be described in detail. The wireless power transmission unit 100 generates a wireless power signal first, and then the wireless power signal is converted into magnetic energy by a first resonance antenna 150, including an inductor L and a capacitor C, through LC resonance. Then, the resulting magnetic energy is magnetically coupled to the second resonance antenna 210 which includes an inductor L and a capacitor C and belongs to the wireless power reception unit 200.

In this case, magnetic energy coupling can be maximized by tuning which is achieved by making the LC resonance frequency of the first resonance antenna 150 and the LC resonance frequency of the second resonance antenna 210 consistent with each other. That is, since the transmission efficiency rapidly increases depending on the similarity between the resonance frequencies, the calibration of resonance frequencies for making the resonance frequencies of the first resonance antenna 150 and the second resonance antenna 210 identical to each other is required.

Furthermore, in order to increase or adjust the intensity of power, a power amplifier 120 is used in the wireless power transmission unit 100. Here, the load impedance required to drive the power amplifier 120 is several tens of ohms, while the impedance of the actual LC coil of the first resonance antenna 150 required to increase the Q-factor is merely several ohms Since the transmission efficiency is considerably decreased by a mismatch between the impedances of the power amplifier 120 and the first resonance antenna 150, the calibration of an impedance match is essential.

Meanwhile, with regard to a magnetic field based on the magnetic coupling, Maxwell's Fourth Equation regarding electromagnetic waves states that "a magnetic field always forms a closed loop."

Accordingly, unlike an electric field having the characteristic of propagating far like water waves, a magnetic field can conserve its energy thanks to the characteristic of returning along a circle unless there is loss due to a medium.

When this characteristic is employed, the wireless power transmission unit 100 can detect the environment of the wireless power reception unit 200 in a situation in which communication is not being performed between the wireless power transmission unit 100 and the wireless power reception unit 200.

That is, when the wireless power transmission unit 100 is turned on and the power consumption device 400 in which the wireless power reception unit 200 has been installed does not exist or is not turned on, the wireless power transmission unit 100 may determine the power consumption device 400 in which the wireless power reception unit 200 has been installed not to exist in a wireless power transmission environment because there is no energy loss from the viewpoint of the wireless power transmission unit 100. In contrast, when the power consumption device 400 in which the wireless power reception unit 200 has been installed exists, the power consumption device 400 in which the wireless power reception unit 200 has been installed may be determined to exist because energy loss occurs from the viewpoint of the wireless power transmission unit 100. When a plurality of power consumption devices 400 in which a plurality of wireless power reception units 200 has respectively been installed exists, the energy loss increases, and the resonance frequency varies with the number of power consumption devices in which the wireless power reception units 200 have been respectively installed due to the mutual inductance between the wireless power transmission unit 100 and the power consumption devices in which the wireless power reception units 200 have been respectively installed.

Accordingly, it is possible to determine whether a power consumption device 400 in which a wireless power reception unit 200 has been installed exists by measuring power returned after power was transmitted by the wireless power transmission unit 100, to detect the number of power consumption devices 400 in which wireless power reception units 200 have been respectively installed when the wireless power reception units 200 exist, and to transmit power in an optimal state through the above-described frequency and impedance adjustment, thereby improving the power transmission efficiency.

Here, the power consumption device 400 is a device which receives a wireless power signal from the wireless power transmission unit 100 through the second resonance antenna 210 of the wireless power reception unit 200 and charges the power source unit 300 of the power consumption device 400 with power or supplies domestic power, thereby consuming the power with which the power source unit 300 was charged or which was supplied thereto. The power consumption device 400 may be, for example, a battery charger or an electronic/household device, such as a television or a computer.

The construction and operation of the wireless power transmission unit 100 and wireless power reception unit 200 of the wireless power transmission/reception apparatus according to the embodiment of the present invention will be described in detail below.

The wireless power transmission unit 100 according to the embodiment of the present invention, as shown in FIG. 2, includes an oscillator 110, a power amplifier 120, an impedance matcher 130, a directional power coupler 140, a first resonance antenna 150, a power detector PD 160, and a controller 170.

The oscillator 110 converts external power into a wireless power signal. Here, the wireless power signal is an Alternating Current (AC) signal. Since an input external AC signal may have an AC signal form which is not appropriate for wireless power transmission, the oscillator 110 converts external power into an AC signal appropriate for wireless transmission and outputs the resulting AC signal.

The oscillation frequency of a wireless power signal generated by the oscillator 110 is lower than the resonance frequency based on the values of the inductor L and capacitor C of the first resonance antenna 150, and is equal to the resonance frequency calculated by adding a mutual inductance value ranging from the first resonance antenna 150 to a receiving end.

In order to increase the efficiency of wireless power transmission, the power amplifier 120 amplifies the wireless power signal so as to increase or adjust the intensity thereof, and outputs the resulting signal.

The directional power coupler 140 includes a plurality of terminals, and changes the direction of an input signal by causing a signal input through one terminal to be output only through one of the remaining contacts and preventing the signal from being output through some other terminal.

The wireless power signal is transmitted to the first resonance antenna 150 through the directional power coupler 140, and a wireless power signal (hereinafter referred to as a 'returned wireless power signal') is input from the magnetic coupling energy forming a closed loop through the first resonance antenna 150 and is then output.

The directional power coupler 140 includes a plurality of input/output terminals, and functions to transmit an input wireless power signal only to a terminal connected to the first resonance antenna 150 and transmit a returned wireless power signal only to a terminal connected to the power detector 160.

Here, it is preferred that the directional power coupler 140 be formed of a circulator having a plurality of terminals. The circulator includes a plurality of terminals, but transmits an input signal in a single direction regardless of the terminal through which the signal is input.

The power detector PD 160 detects a returned wireless power signal output from the directional power coupler 140. The reflected power $P_{reflect}$ depending on signal intensity may be detected from the returned wireless power signal detected by the power detector PD 160.

Meanwhile, a battery charger (not shown) for performing charging using reflected power $P_{reflect}$ detected by the power detector PD 160 may be further included. The power used by the battery charger (not shown) may be used as power for the wireless power transmission unit 100, so that the waste of power can be prevented.

The first resonance antenna 150 includes an inductor L and a capacitor C. When the wireless power signal is input, it is converted into magnetic energy through LC resonance, so that a closed loop is formed.

In order to transmit power in an optimal state as described above, the impedance matcher 130 performs impedance matching between the power amplifier 120 and the first resonance antenna 150.

The controller 170 generally controls the wireless power transmission unit 100.

In greater detail, the controller 170 performs control so that an initial resonance frequency is set, a wireless power signal is generated and amplified using the set initial resonance frequency through the first resonance antenna 150, the amplified wireless power signal is converted into magnetic energy which forms a closed loop using the LC resonance of the inductor L and capacitor C of the first resonance antenna 150, and a returned wireless power signal is received and detected from magnetic coupling energy resulting from magnetic coupling to the wireless power reception units 200 installed in the power consumption devices 400 through the first resonance antenna 150. In this case, reflected power $P_{reflect}$ can be detected from the returned wireless power signal, the resonance frequency between the wireless power transmission unit 100 and the power consumption devices 400 in which the wireless power reception units 200 have been installed is detected based on the variation in reflected power, and the number of power consumption devices 400 in which the wireless power reception units 200 have been installed is detected based on the detected resonance frequency.

Thereafter, the controller 170 increases the power of the wireless power signal so as to achieve power intensity appropriate for the detected number of power consumption devices 400, and causes the wireless power signal to be transmitted in a state in which the power has been increased.

In this case, the controller 170 adjusts the resonance frequency by controlling the first resonance antenna 150 so that the maximum power transmission occurs, and adjusts impedance by controlling the impedance matcher 140.

Figure 3:
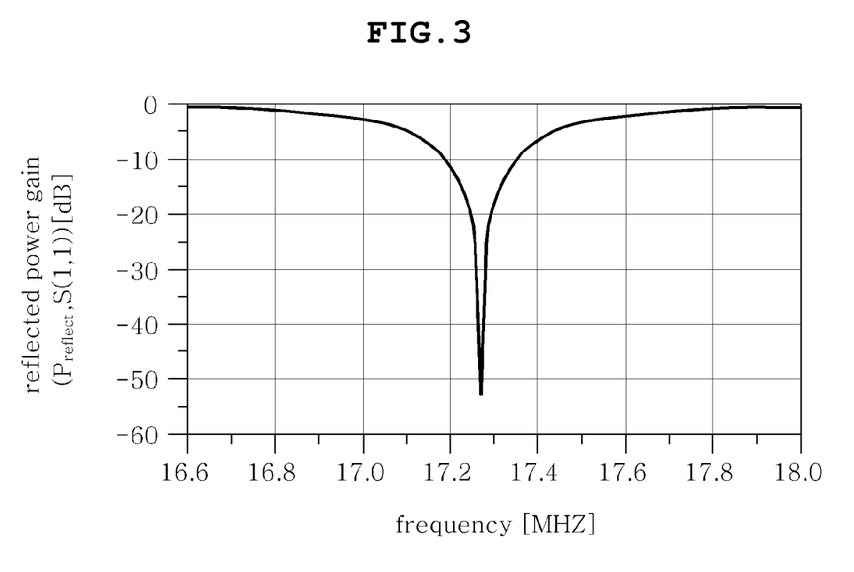
FIG. 3 is a graph of reflected power gain $P_{reflect}$ against frequency.

The processes of adjusting frequency and impedance will be described as follows:

The controller 170 performs control so that reflected power $P_{reflect}$ can be detected from the returned wireless power signal depending on frequency adjustment (frequency tuning) performed by varying the inductance L and capacitance C of the first resonance antenna 150. Through this process, a graph of reflected power gain ($P_{reflect}$, S(1,1)) [dB] against frequency [MHz] can be obtained, and an example of such a graph is illustrated in FIG. 2.

From FIG. 3, it can be seen that a minimum inflection point exists in a reflected power gain curve and the reflected power gain $P_{reflect}$ is minimum at a frequency corresponding to the minimum inflection point. This means that resonance has occurred at the frequency corresponding to the minimum inflection point.

The controller 170 performs control so that reflected power $P_{reflect}$ can be detected from the returned wireless power signal depending on impedance adjustment (impedance tuning) performed by varying the impedance of the impedance matcher 130. Through this process, a graph of reflected power gain ($P_{reflect}$, S(1,1))[dB] against impedance [ohm] can be obtained, and an example of such a graph is shown in FIG. 4.

Figure 4:
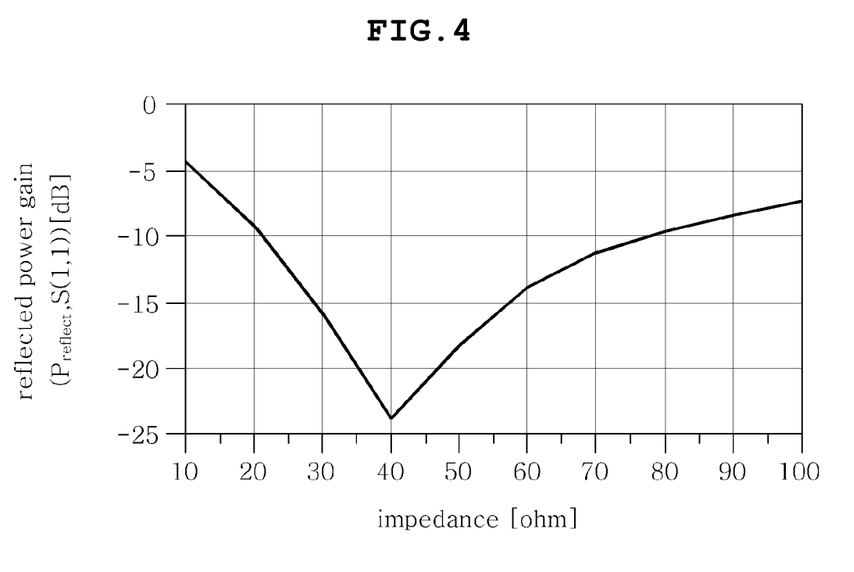
FIG. 4 is a graph of reflected power gain $P_{reflect}$ against impedance.

From FIG. 4, it can be seen that a minimum inflection point exists in a reflected power gain curve and the reflected power gain $P_{reflect}$ is minimum at the impedance corresponding to the minimum inflection point. This means that resonance has occurred at the impedance corresponding to the minimum inflection point.

Meanwhile, the wireless power reception unit 200 provided in the power consumption device 400 according to the embodiment of the present invention comprises a second resonance antenna 210, a switch 220, an impedance matcher 230, a power signal converter 240, a power detector PD 250, and a controller 260.

The second resonance antenna 210 includes an inductor L and a capacitor C. Magnetic energy which forms a closed loop through the LC resonance of the inductor L and the capacitor C is obtained, and is magnetically coupled with magnetic energy generated from the wireless power transmission unit

100. Since the magnetic coupling energy also forms a closed loop, a wireless power signal into which the magnetic coupling energy was converted is received.

The switch 220 performs switching so that the second resonance antenna 210 selectively performs and blocks magnetic coupling with the wireless power transmission unit 100. In other words, the switch 220 determines the reception waiting or reception termination of the wireless power reception unit 200.

When the switch 220 is turned on, the wireless power reception unit 200 receives a wireless power signal. In contrast, when the switch 220 is turned off, the wireless power reception unit 200 stops receiving a wireless power signal.

For example, when the power consumption device 400 in which the wireless power reception unit 200 has been installed does not require power any more (for example, when the charging of a battery is completed or an electronic/household device such as a television or a computer is turned off), the switch 220 terminates magnetic coupling with the wireless power transmission unit 100. In contrast, when the power consumption device 400 in which the wireless power reception unit 200 has been installed requires power (for example, the charging of a battery is started or an electronic/household device such as a television or a computer is turned on), the switch 220 performs switching so that magnetic coupling with the wireless power transmission unit 100 is started.

In order to increase the transmission power gain of a wireless power signal received through the second resonance antenna 210, the impedance matcher 230 performs impedance matching between the second resonance antenna 210 and a power signal converter 240 (which will be described later).

The power signal converter 240 converts the received wireless power signal into an appropriate DC or AC signal so as to charge the power source unit 300 of the power consumption device 400 with power or supply domestic power.

For example, when the power source unit 300 of the power consumption device 400 is of a type in which a specific capacity is stored by performing charging for a predetermined period of time like a battery charger, the power signal converter 240 converts the received wireless power signal into an appropriate DC signal so as to charge the power source unit 300 of the power consumption device 400 with power.

In this case, the wireless power reception unit 200 installed in the power consumption device 400 further includes a battery capacity detector (not shown) capable of detecting the capacity of the battery charger, and transmits a signal detected by the battery capacity detector (not shown) to the controller 260 of the wireless power reception unit 200.

Furthermore, when the power source unit 300 of the power consumption device 400 is of a type in which power is continuously supplied, like an electronic/household device, the power signal converter 240 converts the received wireless power signal into an appropriate AC signal so as to supply domestic power to the power source unit 300 of the power consumption device 400.

Accordingly, the power signal converter 240 may include an AC-AC converter (not shown) for converting the received wireless power signal into an appropriate AC signal and an AC-DC converter (not shown) for converting the received wireless power signal into an appropriate DC signal.

The power detector 250 detects the wireless power signal converted by the power signal converter 240. On the basis of the intensity of the detected wireless power signal, transmission power gain $P_{couple}$ transmitted from the wireless power transmission unit 100 is detected.

The controller 260 performs control so that a wireless power signal is received and converted into an appropriate wireless power signal according to a power supply method, power is supplied, the resulting wireless power signal is detected, and transmission power gain $P_{couple}$ is detected from the detected wireless power signal.

Furthermore, the controller 260 performs control so that the switch 220 is selectively turned on and off based on information about the battery capacity transmitted by the battery capacity detector (not shown).

Furthermore, the controller 260 performs control so that transmission power gain $P_{couple}$ can be detected from the received wireless power signal depending on frequency adjustment (frequency tuning) by varying the inductance L and capacitance C of the second resonance antenna 210. Through this process, a graph of transmission power gain ($P_{couple}$,S(2,1)) [dB] against frequency [MHz], and an example of such a graph is illustrated in FIG. 5.

Figure 5:
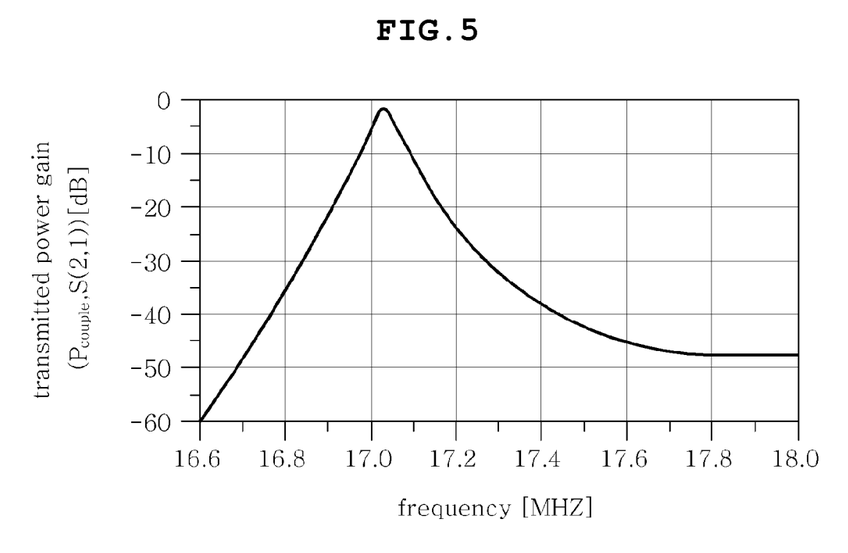
FIG. 5 is a graph of transmission power gain $P_{couple}$ against frequency.

From FIG. 5, it can be seen that a maximum inflection point exists in a transmission power gain curve and the transmission power gain $P_{couple}$ is at a maximum at a frequency corresponding to the maximum inflection point. This means that resonance has occurred at the frequency corresponding to the maximum inflection point.

Furthermore, the controller 260 performs control so that transmission power gain $P_{couple}$ can be detected from the returned wireless power signal depending on impedance adjustment (impedance tuning) performed by varying the impedance of the impedance matcher 230. Through this process, a graph of transmission power gain ($P_{couple}$,S(2,1)) [dB] against impedance [ohm] can be obtained, and an example of such a graph is illustrated in FIG. 6.

Figure 6:
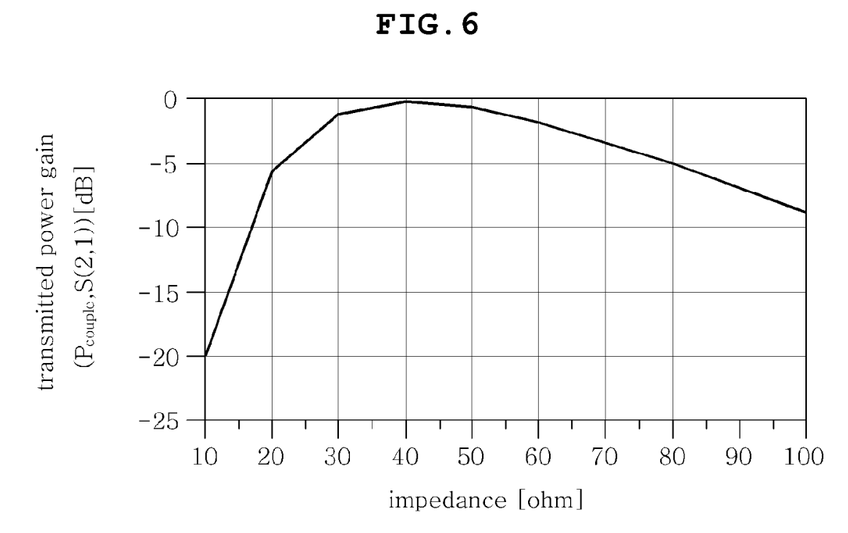
FIG. 6 is a graph of transmission power gain $P_{couple}$ against impedance.

From FIG. 6, it can be seen that a minimum inflection point exists in a reflected power gain curve and it can be seen that a maximum inflection point exists in a transmission power gain curve and the transmission power gain $P_{couple}$ is at a maximum at the impedance corresponding to the maximum inflection point. This means that resonance has occurred at the impedance corresponding to the maximum inflection point.

Figure 7A:
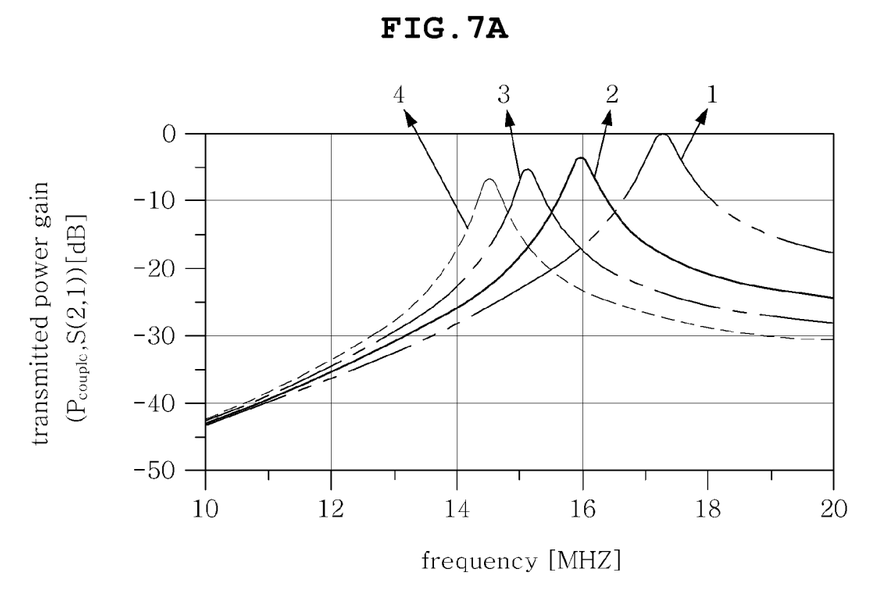
FIG. 7A is a graph showing variations in transmission power gain $P_{couple}$ and resonance frequency depending on the number of power consumption devices.
Figure 7B:
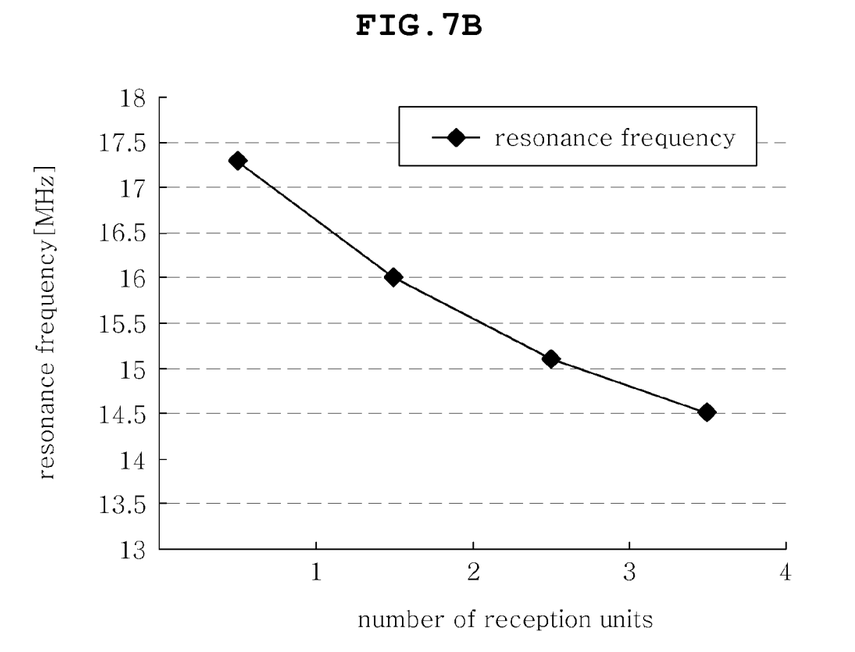
FIG. 7B is a graph showing variations in resonance frequency depending on the number of power consumption devices.

FIG. 7A is a graph showing variations in transmission power gain $P_{couple}$ and resonance frequency depending on the number of power consumption devices 400 in which the wireless power reception units 200 have been respectively installed, and FIG. 7B is a graph showing variations in resonance frequency depending on the number of power consumption devices 400 in which the wireless power reception units 200 have been respectively installed.

From FIGS. 7A and 7B, it can be seen that as the number of power consumption devices 400 increases, the resonance frequency decreases and the transmission gain characteristic $P_{couple}$ decreases.

Accordingly, the wireless power transmission unit 100 can determine the number of power consumption devices 400 to detect the reception environment when the reflected power $P_{reflect}$ and the resonance frequency are known.

Figure 8:
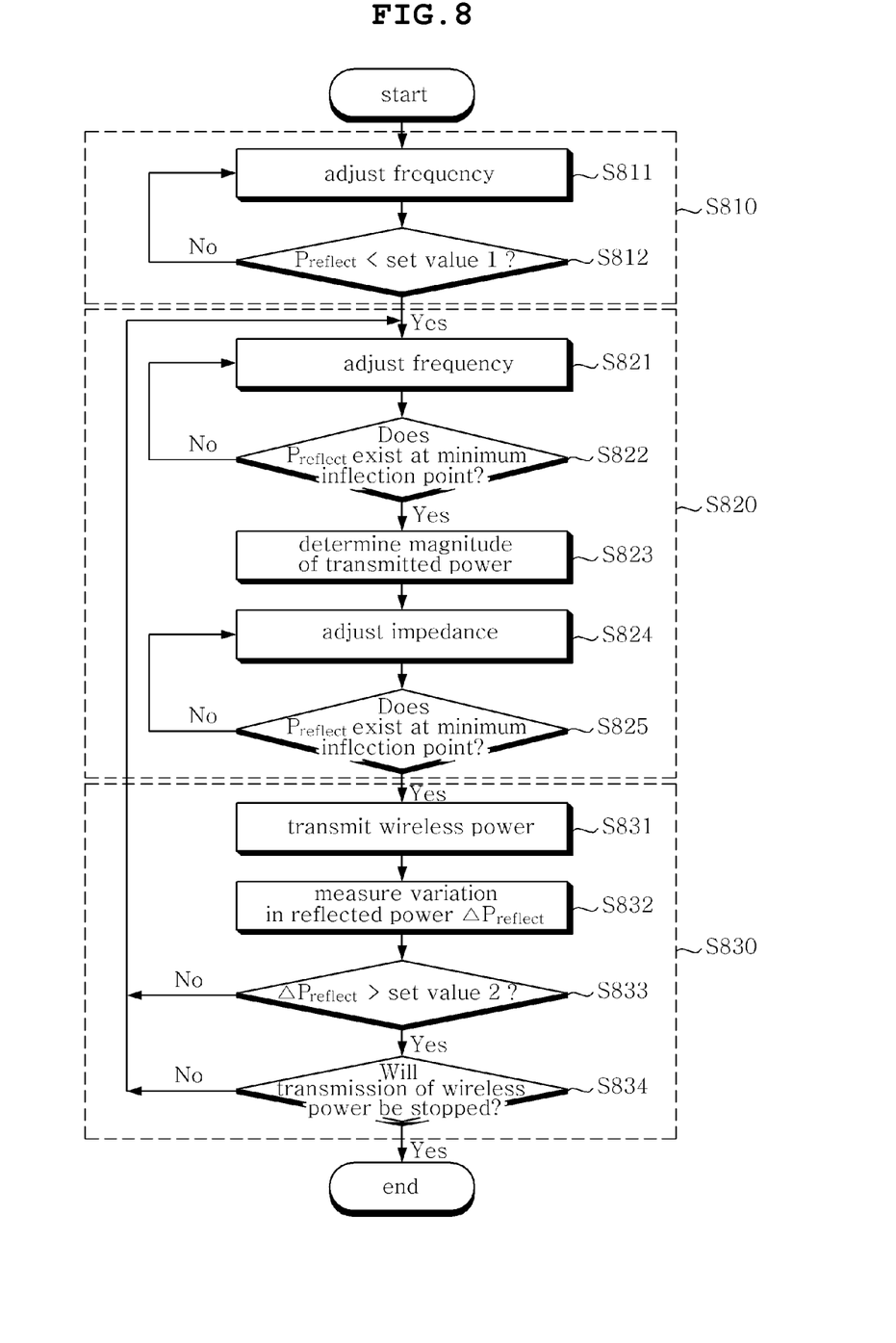
FIG. 8 is a flowchart showing a method of operating the wireless power transmission unit of FIG. 1.

FIG. 8 is a flowchart showing a method of operating the wireless power transmission unit 100 in the wireless power transmission/reception apparatus according to the embodiment of the present invention.

Referring to FIG. 8, the operation of the wireless power transmission unit 100 will now be described. The controller 170 of the wireless power transmission unit 100 carries out power consumption device presence determination mode S810, calibration mode S820, and wireless power transmission mode S830.

In power consumption device presence determination mode S810, when the wireless power transmission unit 100 is turned on, an initial resonance frequency is set at step S811. Thereafter, the reflected power $P_{reflect}$ of wireless power transmitted at the set initial resonance frequency through the first resonance antenna 150 of the wireless power transmission unit 100 is detected and then whether the reflected power $P_{reflect}$ is less than the set value 1 is determined at step S812.

Here, the set value 1 is set as follows:

For example, in the case where the wireless power reception unit 200 installed in the power consumption device 400 does not exist or is turned off, assuming that the wireless power transmission unit 100 has a reflection loss of about 5% and the power transmitted by the wireless power transmission unit 100 is '1', set value 1 is set to a value slightly less than the reflected power $P_{reflect}$ of 0.95 of the transmitted power of '1', for example, 0.9.

Then, at step S812, if the reflected power $P_{reflect}$ is less than 0.9, it is determined that there is power loss. If the reflected power $P_{reflect}$ is equal to or greater than 0.9, it is determined that there is no power loss. In other words, if the reflected power $P_{reflect}$ is less than set value 1, this means that the wireless power reception unit 200 installed in the power consumption device 400 exists or is turned on, so that it is determined that the wireless power reception unit 200 installed in the power consumption device 400 exists.

After whether the power consumption device 400 in which the wireless power reception unit 200 has been installed exists or not has been determined as described above, calibration mode for establishing an optimal wireless power transmission state through frequency adjustment and impedance adjustment is carried out.

In calibration mode S820, in order to find the resonance frequency for the optimal wireless power transmission between the wireless power transmission unit 100 and the wireless power reception unit 200, reflected power $P_{reflect}$ depending on the variation in frequency is detected while the frequency is adjusted (frequency tuning is performed) by varying the inductance L and capacitance C of the first resonance antenna 150 at step S821. Thereafter, the minimum inflection point is determined to be the optimal resonance frequency by determining whether the reflected power $P_{reflect}$ exists at a minimum inflection point at step S822. The reflected power $P_{reflect}$ can be detected from the resonance frequency, and the number of power consumption devices 400 in which the wireless power reception units 200 have been respectively installed can be detected based on the variations in resonance frequency and reflected power $P_{reflect}$. Accordingly, the magnitude of transmitted power depending on the number of power consumption devices 400 in which wireless power reception units 200 have been respectively installed is determined at step S823. Thereafter, impedance matching is performed to achieve the optimal wireless power between the wireless power transmission unit 100 and the wireless power reception unit 200. Such impedance matching is performed by measuring reflected power $P_{reflect}$ based on variation in impedance while adjusting impedance (performing impedance tuning) by varying the impedance, like the frequency adjustment, at step S824. Thereafter, the minimum inflection point is determined to be optimal impedance by determining whether the reflected power $P_{reflect}$ exists at a minimum inflection point at step S825. As a result, by the frequency and impedance calibration steps for performing optimal wireless power transmission, wireless power can be transmitted in an optimal transmission state.

In wireless power transmission mode S830, wireless power is transmitted in the optimal transmission state after calibration mode S820 at step S831. Thereafter, the variation $\Delta P_{reflect}$ between currently reflected power $P_{p\_ref}$ and initial reflected power $P_{o\_ref}$ is measured at step S832. Thereafter, whether the reflected power variation $\Delta P_{reflect}$ is greater than the set value 2 is determined at step S833. If the reflected power variation $\Delta P_{reflect}$ is equal to or less than the set value 2, it is determined that charging has not been completed or power supply has not been stopped for any one of a plurality of power consumption devices in which the wireless power reception units 200 have been respectively installed, calibration mode S820 is carried out, and then wireless power is transmitted in an optimal transmission state. If the reflected power variation $\Delta P_{reflect}$ is greater than the set value 2, it is determined that charging has been completed or power supply has been stopped for at least one of the plurality of power consumption devices in which the wireless power reception units 200 have been respectively installed and whether to stop wireless power transmission is determined at step S834. If wireless power transmission is determined to be stopped, wireless power transmission is stopped. In contrast, if wireless power transmission is determined not to be stopped, calibration mode S820 is carried out again, and wireless power is transmitted in an optimal transmission state.

Here, assuming that the reflected power variation $\Delta P_{reflect}$ obtained when charging has been completed or power supply has been stopped for all of the plurality of power consumption devices in which the wireless power reception units 200 have been respectively installed is '1' and the plurality of power consumption devices in which the wireless power reception units 200 have been respectively installed has the same reflected power $P_{reflect}$, the set value 2 is set to a value slightly less than 1/N (where N is the number of power consumption devices 400 in which the wireless power reception units 200 have been respectively installed). For example, when four reception units exist, the set value 2 is set to 0.20. If the reflected power variation $\Delta P_{reflect}$ is greater than 0.20, it is determined that charging has been completed or power supply has been stopped for at least one of the power consumption devices 400. If the reflected power variation $\Delta P_{reflect}$ is less than 0.20, it is determined that charging has not been completed or power supply has not been stopped for any one of the power consumption devices 400.

Meanwhile, the controller 150 of the wireless power transmission unit 100 may further perform, between steps S811 and S812 in power consumption device presence determination mode S810, the step of detecting reflected power $P_{reflect}$ depending on the variation in frequency while adjusting the frequency (performing frequency tuning) by varying the inductance L and capacitance C of the first resonance antenna 150 so as to find the resonance frequency for the optimal wireless power transmission between the wireless power transmission unit 100 and the wireless power reception unit 200, and the step of finding a minimum inflection point by determining whether the reflected power P reflect exists at a minimum inflection point. Here, the frequency tuning step is not a fine tuning step like that in calibration mode S820, but is performed using frequency variation widths. When these steps are further performed, the time required to find the resonance frequency can be reduced.

Figure 9:
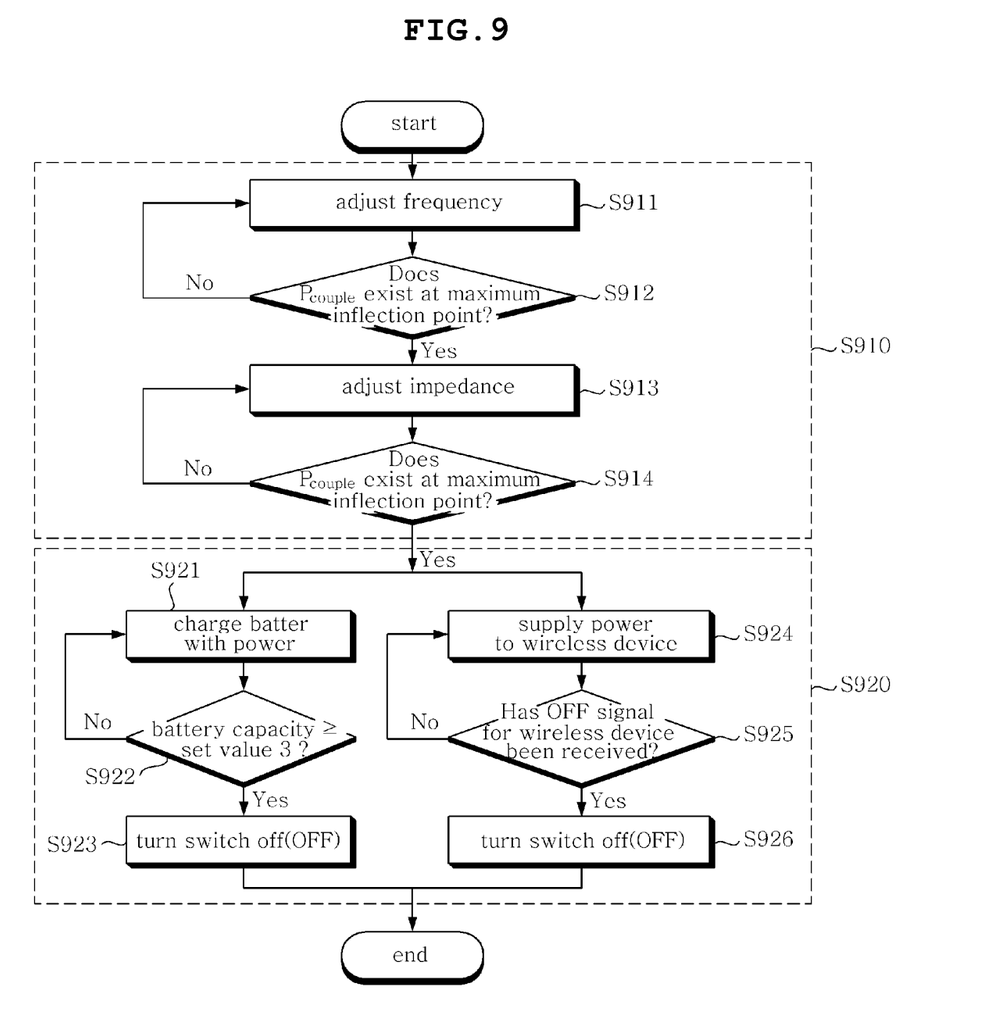
FIG. 9 is a flowchart showing a method of operating the wireless power reception unit of FIG. 1.

FIG. 9 is a flowchart illustrating a method of operating the wireless power reception unit 200 in the wireless power transmission/reception apparatus according to an embodiment of the present invention.

Referring to FIG. 9, the operation of the wireless power reception unit 200 will now be described. The controller 260 of the wireless power reception unit 200 carries out calibration mode S910 and power supply mode S920.

Calibration mode S910 may be configured to perform transmission frequency tuning or impedance matching by varying the inductance L and capacitance C of the second resonance antenna 210 of the wireless power transmission unit 200 so as to receive maximum transmitted power. The steps thereof are as follows:

In calibration mode S910, in order to receive maximum transmitted power, the transmitted power $P_{couple}$ based on the variation in frequency is detected while the to frequency is adjusted (frequency tuning is performed) by varying the inductance L and capacitance C of the second resonance antenna 210 so as to achieve tuning to the transmission frequency at step S911. Thereafter, whether the transmitted power $P_{couple}$ exists at a maximum inflection point is determined and the maximum inflection point is determined to be the optimal resonance frequency at step S912. At the resonance frequency, the maximum transmitted power $P_{couple}$ is received. Thereafter, as in the frequency adjustment, in order to receive maximum transmitted power, transmitted power $P_{couple}$ based on the variation in impedance is measured while impedance is adjusted (impedance tuning is performed) by varying the impedance so as to achieve impedance matching at step S913. Thereafter, whether the transmitted power $P_{couple}$ exists at a maximum inflection point is determined and the maximum inflection point is determined to be optimal impedance at step S914. As a result, by the frequency and impedance calibration steps for performing optimal wireless power transmission, wireless power can be transmitted in an optimal transmission state. The wireless power received as described above is used to charge the power source unit 300 of the power consumption device 400 requiring wireless power or is used to carry out power supply mode S920 for supplying power.

In power supply mode S920, the power source unit 300 of the power consumption device 400 may perform a method of storing a specific capacity by performing charging for a predetermined period of time like a battery charger and/or a method of continuously supplying power like an electronic/household device.

First, in the case of the power source unit 300 of the power consumption device 400 such as a battery charger, the power source unit 300 starts to be charged S921, the current capacity of a battery charged at the power source unit 300 is detected using a battery capacity detector (not shown), whether the detected battery capacity is equal to or greater than the set value 3 is successively determined at step S922, and the switch 220 of the wireless power reception unit 200 is turned off if the current battery capacity is equal to or greater than set value 3 at step S923. Here, set value 3 is set to a value which is obtained when the power source unit 300 is all charged.

Furthermore, in this case, before calibration mode S910, battery capacity determination mode (not shown) may be carried out.

The battery capacity determination mode is carried out in a state in which the switch 220 of the wireless power reception unit 200 installed in the power consumption device 400 has been turned off. The battery capacity determination mode is configured to successively determine whether the capacity of a battery charged at the power source unit 300 is less than the set value 4 and to turn the switch 220 of the wireless power reception unit 200 installed in the power consumption device 400 on if the battery capacity is less than the set value 4, thereby causing the wireless power reception unit 200 to enter into the state of being capable of receiving wireless power. Here, the set value 4 is set to a value which is obtained when the capacity of the battery charged at the power source unit 300 is all consumed.

Meanwhile, in the case of the power source unit 300 of the power consumption device 400 such as an electronic/household device, appropriate domestic power is supplied to the power source unit 300 at step S924, whether an off signal for turning off the power consumption device 400 has been received from the outside is successively determined S925, and, if an off signal has been received, the switch 220 of the wireless power reception unit 200 is turned off so as to cut off the power supply to the power consumption device 400 at step S926.

As described above, with regard to the wireless power transmission/reception apparatus according to the embodiment of the present invention, when a single wireless power transmission unit and a plurality of wireless power reception units respectively installed in a plurality of power consumption device exist, the wireless power transmission unit and the plurality of wireless power reception units are all maintained at the same resonance frequency by the mutual calibration mode between the wireless power transmission unit and the plurality of wireless power reception units, thereby enabling simultaneous power transmission.

Figure 10:
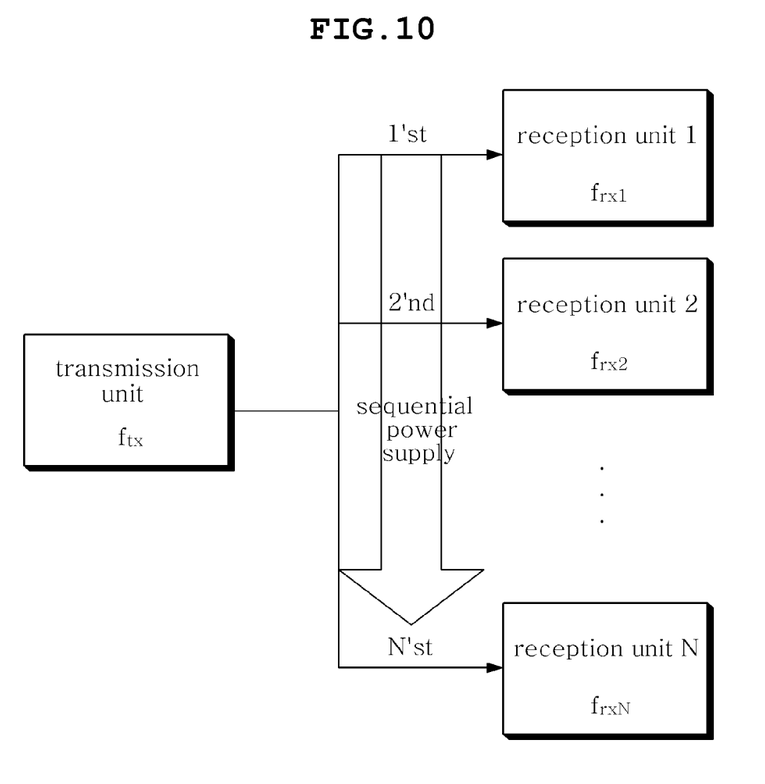
FIG. 10 is a diagram showing a method in which a single wireless power transmission unit sequentially supplies power to a plurality of wireless power reception units.

Furthermore, as shown in FIG. 10, when a single wireless power transmission unit and a plurality of wireless power reception units respectively installed in a plurality of power consumption devices exist, respective resonance frequencies of the plurality of wireless power reception units may be set to different resonance frequencies, so that the wireless power transmission unit and the wireless power reception units are associated in a one-to-one correspondence, thereby enabling sequential wireless power transmission. This is similar to the method of assigning unique Identifiers (IDs) to a plurality of wireless power reception units, in which case wireless power can be sequentially provided to the plurality of wireless power reception units by tuning the transmission frequency of the wireless power transmission unit to respective resonance frequencies of the plurality of wireless power reception units.

In other words, as shown in FIG. 10, when wireless power transmission to wireless power reception unit 1 of the plurality of wireless power reception units is completed, wireless power reception unit 1 automatically turns off the switch thereof, thereby cutting off magnetic energy coupling with the wireless power transmission unit. Then, the wireless power transmission unit becomes aware that the charging of the wireless power reception unit 1 has been completed or power supply has been stopped, and tunes the oscillation frequency and the resonance frequency to each other for subsequent wireless power reception unit 2. Using this method, control is performed so that wireless power can be sequentially supplied to the plurality of wireless power reception units.

According to the wireless power transmission/reception apparatus and method of the present invention, a transmission unit can detect a reception environment without using a separate communication device or system, so that the cost of the wireless power transmission/reception apparatus is reduced and the construction and control of the apparatus are simplified.

Furthermore, according to wireless power transmission/reception apparatus of the present invention, calibration is performed by frequency adjustment and impedance matching, so that the very narrow-band resonance characteristic between a transmission unit and reception units can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless power transmission/reception apparatus, comprising:
    a wireless power transmission unit for receiving power from an outside area, generating a wireless power signal to be wirelessly transmitted, and wirelessly transmitting the generated wireless power signal; and
    a wireless power reception unit installed in each of the power consumption devices, and configured to receive the wireless power signal from the wireless power transmission unit in a magnetic resonance manner, provide the wireless power signal to at least one connected power consumption device, and return a remaining wireless power signal, not consumed by at least one unconnected power consumption device, to the wireless power transmission unit,
    whereby, the wireless power transmission unit sets an initial resonance frequency, transmits a wireless power signal to the wireless power reception unit by using the initial resonance frequency, receives a returned wireless power signal returned from the wireless power reception units depending on the frequency adjustment while continuously tuning the frequency so as to search for a minimum inflection point of the returned wireless power signal, determines the minimum inflection point as a resonance frequency, detects the number of power consumption devices installed with wireless power reception units in a state of receiving wireless power signals depending on the determined resonance frequency and transmits the wireless power signals by using resonance frequency appropriate for the number of power consumption devices installed with wireless power reception units in the detected reception state.

2. The wireless power transmission/reception apparatus as set forth in claim 1, wherein the wireless power transmission unit comprises:
    a power signal generator for receiving the power from the outside, and generating and outputting the wireless power signal, that is, power to be wirelessly transmitted;
    a first resonance antenna comprised of an inductor and a capacitor, and configured to transmit the wireless power signal using resonance frequency depending on the inductor and the capacitor, and receive and output the returned wireless power signal output from the wireless power reception unit;
    a directional power coupler having directionality so that the wireless power signal input from the power signal generator through a first port thereof is output to the first resonance antenna through a second port thereof and the returned wireless power signal input from the first resonance antenna through the second port is output through a third port thereof;
    a power detector for detecting and outputting power of the returned wireless power signal output through the third port of the directional power coupler; and
    a controller for determining whether the power consumption devices are connected based on intensity of power of the returned wireless power signal detected by the power detector, detecting the number of power consumption devices by using resonance frequency wherein a maximum power transmission is carried out, and in case of connection of power consumption devices, and controlling the first resonance antenna so that the wireless power signal is transmitted using power intensity appropriate for the detected number of power consumption devices.

3. The wireless power transmission/reception apparatus as set forth in claim 2, further comprising an impedance matcher disposed between the power signal generator and the first resonance antenna and configured to provide impedance matching between the power signal generator and the first resonance antenna.

4. The wireless power transmission/reception apparatus as set forth in claim 3, wherein the controller searches for a minimum inflection point of the returned wireless power signal received by the power detector while varying impedance of the impedance matcher, and sets the impedance of the impedance matcher to impedance corresponding to the found minimum inflection point.

5. The wireless power transmission/reception apparatus as set forth in claim 2, wherein the controller searches for a minimum inflection point of the returned wireless power signal received by the power detector while adjusting resonance frequency of the first resonance antenna and sets the resonance frequency of the first resonance antenna to a resonance frequency corresponding to the found minimum inflection point.

6. The wireless power transmission/reception apparatus as set forth in claim 2, wherein the power signal generator comprises:
    an oscillator for receiving external power and generating a desired wireless power signal to be transmitted; and
    a power amplifier for amplifying and outputting the wireless power signal generated by the oscillator.

7. A wireless power transmission unit, comprising:
    a power signal generator for receiving power from an outside, and generating and outputting a wireless power signal, that is, power to be wirelessly transmitted;
    a first resonance antenna comprised of an inductor and a capacitor, and configured to transmit the wireless power signal using resonance frequency depending on the inductor and the capacitor, and receive and output a returned wireless power signal returned from a wireless power reception unit;
    a directional power coupler having directionality so that the wireless power signal input from the power signal generator through a first port thereof is output to the first resonance antenna through a second port thereof and the returned wireless power signal input from the first resonance antenna through the second port is output through a third port thereof;
    a power detector for detecting and outputting power of the returned wireless power signal output through the third port of the directional power coupler; and
    a controller for determining whether the power consumption devices are connected based on intensity of the power of the returned wireless power signal detected by the power detector, detecting the number of power consumption devices by using resonance frequency wherein a maximum power transmission is carried out, and in case of connection of power consumption devices, performing control so that the wireless power signal is transmitted using power intensity appropriate for the detected number of power consumption devices, setting an initial resonance frequency, transmitting a wireless power signal to the wireless power reception unit by using the initial resonance frequency, receiving a returned wireless power signal returned from the wireless power reception units depending on the frequency adjustment while continuously tuning the frequency so as to search for a minimum inflection point of the returned wireless power signal, determining the minimum inflection point as a resonance frequency, detecting the number of power consumption devices installed with wireless power reception units in a state of receiving wireless power signals depending on the determined resonance frequency and transmitting the wireless power signals using resonance frequency appropriate for the number of power consumption devices installed with wireless power reception units in the detected reception state.

8. The wireless power transmission unit as set forth in claim 7, further comprising an impedance matcher disposed between the power signal generator and the first resonance antenna and configured to provide impedance matching between the power signal generator and the first resonance antenna.

9. The wireless power transmission unit as set forth in claim 7, further comprising a battery charger for performing charging using the power of the returned wireless power signal detected by the power detector.

10. The wireless power transmission unit as set forth in claim 7, wherein the directional power coupler is a circulator.

11. The wireless power transmission unit as set forth in claim 8, wherein the controller searches for a minimum inflection point of the returned wireless power signal received by the power detector while varying impedance of the impedance matcher, and sets the impedance of the impedance matcher to an impedance corresponding to the found minimum inflection point.

12. The wireless power transmission unit as set forth in claim 7, wherein the controller searches for a minimum inflection point of the returned wireless power signal received by the power detector while adjusting resonance frequency of the first resonance antenna and sets the resonance frequency of the first resonance antenna to a resonance frequency corresponding to the found minimum inflection point.

13. A wireless power transmission/reception method, comprising:
    a wireless power transmission unit transmitting a wireless power signal to a wireless power reception unit, being returned a remaining wireless power signal of the wireless power signal to be provided to a power consumption device in which the wireless power reception unit has been installed, and determining whether at least one power consumption device has been connected based on intensity of the power of the returned wireless power signal; and
    the wireless power transmission unit, if at least one power consumption device is determined to have been connected, setting an initial resonance frequency, transmitting a wireless power signal to the wireless power reception unit by using the initial resonance frequency, receiving a returned wireless power signal returned from the wireless power reception units depending on the frequency adjustment while continuously tuning the frequency so as to search for a minimum inflection point of the returned wireless power signal, determining the minimum inflection point as a resonance frequency, detecting the number of power consumption devices installed with wireless power reception units in a state of receiving wireless power signals depending on the determined resonance frequency and transmitting a wireless power signal at a power intensity appropriate for the detected number of power consumption devices.

14. The wireless power transmission/reception method as set forth in claim 13, wherein the wireless power transmission unit transmitting a wireless power signal, being returned a remaining wireless power signal and determining whether at least one power consumption device has been connected comprises:
    the wireless power transmission unit transmitting the wireless power signal to the wireless power reception unit in a magnetic resonance manner;
    a power consumption device in which the wireless power reception unit has been installed receiving the transmitted wireless power signal, and returning the remaining wireless power signal; and
    the wireless power transmission unit receiving the returned wireless power signal, detecting a power intensity, and determining whether a power consumption device has been connected.

15. The wireless power transmission/reception method as set forth in claim 13, wherein the wireless power transmission unit searching for a resonance frequency, detecting a number of power consumption devices and transmitting a wireless power signal comprises:
    the wireless power transmission unit, if a power consumption device is determined to have been connected, searching for a minimum inflection point of the returned wireless power signal while varying resonance frequency; and
    the wireless power transmission unit determining resonance frequency corresponding to the found minimum inflection point to be resonance frequency at which maximum power transmission is performed, detecting a number of power consumption devices using the resulting resonance frequency, and transmitting a wireless power signal at a power intensity appropriate for the detected number of power consumption devices.

16. A wireless power transmission method, comprising:
    a wireless power transmission unit transmitting a wireless power signal to a wireless power reception unit;
    the wireless power transmission unit receiving a returned wireless power signal from a wireless power reception unit, detecting a power intensity, and determining whether at least one power consumption device has been connected based on intensity of the power of the returned wireless power signal; and
    the wireless power transmission unit, if at least one power consumption device is determined to have been connected, setting an initial resonance frequency, transmitting a wireless power signal to the wireless power reception unit by using the initial resonance frequency, receiving a returned wireless power signal returned from the wireless power reception units depending on the frequency adjustment while continuously tuning the frequency so as to search for a minimum inflection point of the returned wireless power signal, determining the minimum inflection point as a resonance frequency, detecting the number of power consumption devices installed with wireless power reception units in a state of receiving wireless power signals depending on the determined resonance frequency and transmitting a wireless power signal at a power intensity appropriate for the detected number of power consumption devices.

17. The wireless power transmission method as set forth in claim 16, wherein the wireless power transmission unit searching for a resonance frequency, detecting a number of power consumption devices and transmitting a wireless power signal comprises:
    the wireless power transmission unit, if at least one power consumption device is determined to have been connected, searching for a minimum inflection point of a returned wireless power signal while varying resonance frequency; and the wireless power transmission unit determining a resonance frequency corresponding to the found minimum inflection point to be a resonance frequency at which maximum power transmission is performed, detecting the number of power consumption devices using the determined resonance frequency, and transmitting a wireless power signal at a power intensity appropriate for the detected number of power consumption devices.

* * * * *